United States Patent

[11] 3,631,702

[72] Inventor Howard I. Podell
 Larchmont, N.Y.
[21] Appl. No. 877,574
[22] Filed Nov. 26, 1969
[45] Patented Jan. 4, 1972
[73] Assignee United Shoe Machinery Corporation
 Flemington, N.J.
 Original application May 23, 1968, Ser.
 No. 731,416, now Patent No. 3,530,920.
 Divided and this application Nov. 26, 1969,
 Ser. No. 877,574

[54] SELF-LOCKING THREADED FASTENERS
 3 Claims, 11 Drawing Figs.
[52] U.S. Cl. .................................................. 72/88,
 72/469
[51] Int. Cl. .................................................. B21h 3/06
[50] Field of Search .................................. 72/469, 88,
 90; 10/10

[56] References Cited
 UNITED STATES PATENTS
 2,256,269 9/1941 Stoll ............................ 72/469
 2,284,659 6/1942 Hosking ....................... 72/88
 2,352,540 6/1944 Hanneman .................... 72/88 X
 2,371,365 3/1945 Tomalis et al. ................ 72/88
 3,308,645 3/1967 Hampton ...................... 72/469
 3,460,598 8/1969 Thurston ...................... 10/10 X Primary Examiner—Milton S. Mehr
Attorneys—W. Bigelow Hall, Richard A. Wise and Maurice R. Boiteau ABSTRACT: A self-locking threaded fastener such as a screw in which locking action is obtained from at least one locking zone, parts of two adjacent turns leaning toward each other and including between them a groove of reduced thread angle. The threads on the product are advantageously formed by rolling with novel dies including a lock forming area in which normal internal support for the flanks of developing thread ridges are removed during the latter part of the thread-rolling operation thereby causing the pressure applied to external flanks to result in leaning of the locking turn portions toward each other.

Inventor
Howard I. Podell
By his Attorney

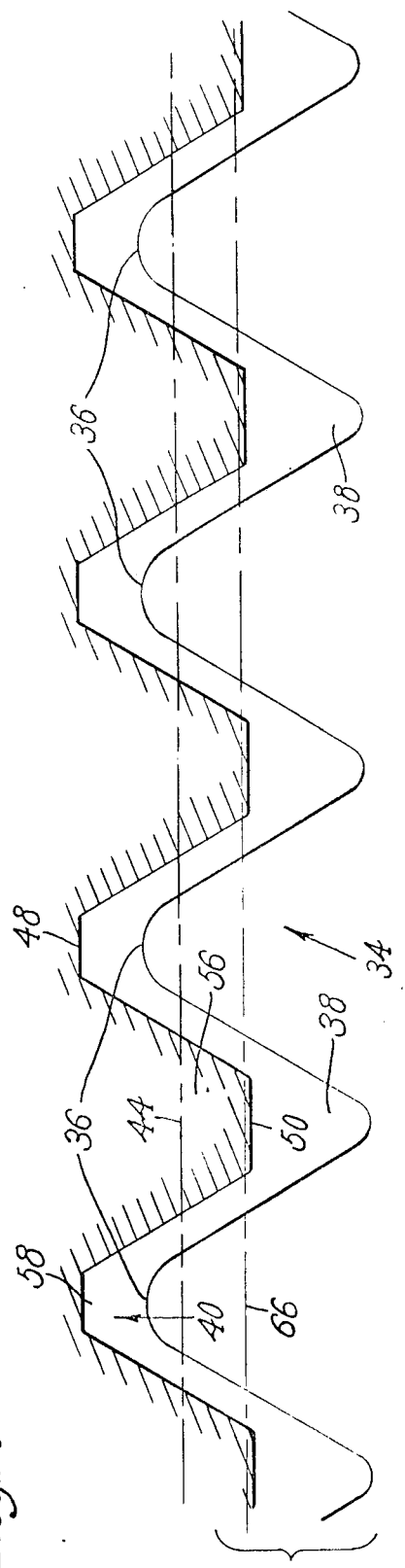
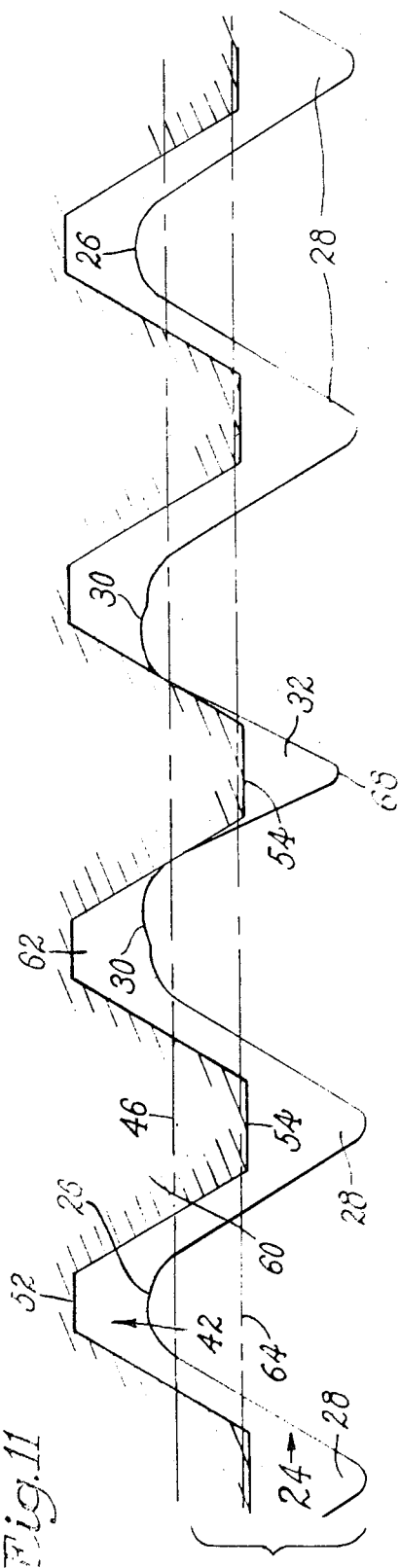

SELF-LOCKING THREADED FASTENERS

This is a division of application Ser. No. 731,416, filed May 23, 1968, now U.S. Pat. No. 3,530,920.

This invention relates generally to self-locking threaded fasteners and more particularly to such fasteners in which a locking zone is formed in the thread itself without the introduction of added locking elements.

The widespread use of self-locking threaded fasteners in goods manufactured in large quantities is highly desirable because such fasteners very often not only contribute to greater safety in the use of the goods but may also add to the reliability and durability of the goods in areas of the product where safety in their use is not an important factor. Although the use of self-locking threaded fasteners is growing rapidly, there have been a number of reasons which have contributed to restricting their more extensive use. A major limiting factor has been that of relatively high installed cost of conventional self-locking threaded fasteners. In those fasteners which derive their locking action from a plastic locking element, several operations are required for mounting the locking element on the fastener. On the other hand when the locking action is obtained by a special thread form in one or both of two mating threaded members to produce an interference fit, not only are added costs encountered in providing special tooling for the manufacture of the special thread but also and more importantly expenditures are caused by the fact that such fasteners usually have a significantly higher installation torque. Under the most adverse tolerance conditions, seating torque may reach such a high level that bolt heads are actually sheared off during installation. At any rate, heavier tools are required for a given screw size and production rates are lowered thereby further adding to the installed cost.

Another important factor in limiting the more widespread use of self-locking fasteners is the failure of conventional self-locking fasteners to satisfy the requirements of the environment in which the fasteners must be used or of the normally expected conditions of use. For example, many of the conventional self-locking threaded fasteners are ineffective at temperatures exceeding 300° F. In addition, few conventional self-locking fasteners are completely reliable when subjected to severe vibration for extended periods of time.

In addition to adverse environmental conditions of temperature and vibration another detrimental aspect of conventional self-locking fasteners relates to the manner in which the locking action is produced. Generally in fasteners without added locking elements, the locking action is obtained by stressing one or both of the mating elements beyond their elastic limits. As a result such fasteners tend to show substantial loss of locking quality after limited use. When employed with mating parts manufactured to standard commercial tolerances, such fasteners often lose their locking characteristics almost completely when their first mating part is replaced by another.

It is accordingly an object of the present invention to provide a self-locking threaded fastener in which the thread including a locking zone may be produced economically on standard commercially available thread forming machines employing standard tools requiring a minimum of modification.

Another object is to produce self-locking screws at speeds comparable to those which would be achieved in processing standard nonlocking screws of comparable size and material.

Yet another object is to provide a locking thread structure adapted to retaining its locking action after repeated reuse and in spite of an interchange of mating part.

In the achievement of the foregoing objects a feature of the invention resides in the formation of a thread of a special locking form in a predetermined zone while threads of standard form may be produced along the remainder of the length of the fastener. In a screw according to a preferred form of the invention, for example, the thread is locally modified in its form to produce a locking action for an extent ranging between a small fraction of a thread turn up to a half turn which will be referred to as an elemental locking zone. It will be realized, however, that two elemental locking zones may be located end to end on a screw and thus provide a composite locking zone extending 360° about the axis of the screw.

The modification of the thread in the locking zone while not completely uniform throughout its extent, is generally characterized by several variations from the standard thread. In a screw, the thread in the locking zone is formed with a reduced thread angle, a shortened dedendum, a broadened crest width and an increased width across the flanks. As a result, when such a screw is engaged in a standard threaded opening or nut, there is a controlled localized strain within the elastic limit of the material in the screw. The thread form in the locking zone yields an interfering fit primarily in the flank area as it adapts to the standard thread form of the mating part. The degree of deviation between the standard thread form and that in the locking zone is accurately controlled to maintain the stress within the elastic limit of the screw material. Furthermore, it is possible to confine the strain to the elastic range of the material of the screw even though the standard threads of the mating part are manufactured to broad commercial tolerances and still obtain repeated locking action superior to that conventionally attainable.

Another feature of the invention relates to the method by which screws may be processed so that the locking zone is formed at the same time that the threads are rolled without requiring supplementary operations. In the practice of the method a screw blank of standard size is rolled between thread rolling dies which may be purchased as standard dies and readily modified to produce the locking zone. It will first be understood that during a conventional thread rolling operation, material of the screw blank is progressively forced and directed by the serrated surfaces of the dies from the valleys into the crest to form the thread. However, in practicing the present method at least one of the dies is provided with a lock forming area in which the material of the screw blank is radially and axially compressed at points separated along the axis of the screw while the intervening screw blank surfaces, which have already been partly formed are left free of support and guidance. This is accomplished by eliminating from at least one of the dies the support for the intervening screw blank surfaces. This is conveniently achieved by removing a single ridge from the die for part of its length. The result of this relationship between screw blank and rolling die as the blank travels its last half revolution between the dies, is a precise and predictable local advance of blank material into the thread groove.

Other features of the invention relate to the modified rolling dies themselves, and to the extent of the support removed from the dies to produce a novel screw having a plurality of locking zones at predetermined relative locations in the finished product.

The foregoing objects and features and numerous advantages of the present invention will become more evident from the following detailed description of an illustrative embodiment of the invention together with a description of the basic process by which the embodiment is realized, taken in connection with the accompanying drawings in which:

FIG. 10 is a view showing in separated relationship a normal screw thread profile greatly enlarged and matched with a standard nut profile; and FIG. 11 is a view similar to FIG. 10 but showing screw threads of a locking zone according to the present invention engaging a standard nut profile.

Figure 1:
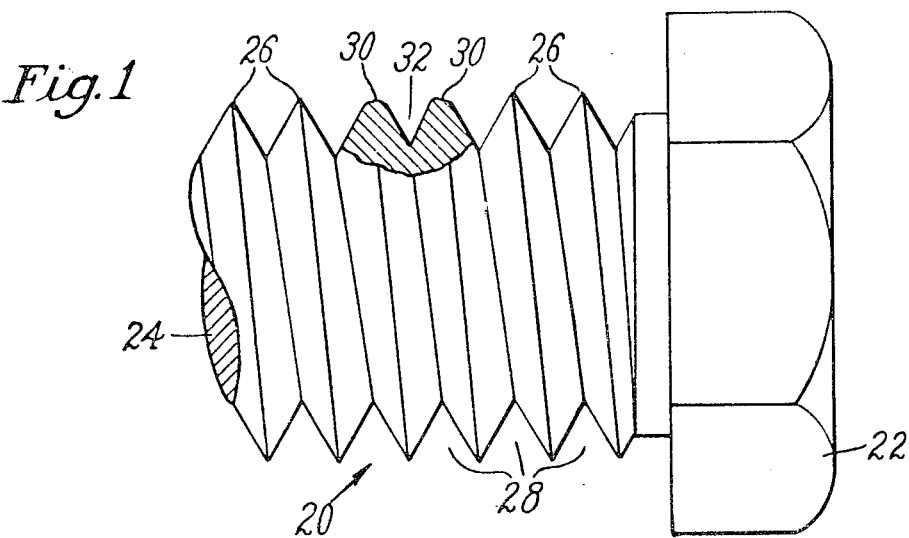
FIG. 1 is a view in side elevation and on an enlarged scale, and with a portion broken away for clarity, of a screw including a locking zone according to the present invention.

Prior to describing the embodiment of the invention as depicted in the drawings it is considered desirable to explain certain departures from normal thread terminology which are adapted for convenience in this specification. NOrmally a single thread is defined as a single-helical ridge of uniform section on the internal or external surface of a cylinder, cone in the case of a tapered thread, left by forming a continucus single helical groove in the appropriate cylindrical surface. Because the locking action in the locking zone according to the present invention is derived from localized variations in the form of the ridge and of the groove and will more clearly appear in an axial section of fasteners, it is considered more convenient and less cumbersome to speak of each turn as though it were a separate ridge or groove rather than as a continuation of an adjacent turn. Normal terminology such as crest, root, flank will be retained to refer to parts of a single turn or ridge. Another departure from normal thread terminology necessitated by the nature of the invention is the concept of pitch diameter which is normally considered to be that of an imaginary cylinder passing through threads at such points as to make the width of ridge and groove equal. In this specification, wherever locking action is described, a theoretical basic pitch diameter applicable to normal thread turns is established and those thread turns which provide the locking action are considered as abnormal at the theoretical pitch diameter.

Turning now to the drawings, particularly FIG. 1, there is shown on an enlarged scale, a screw indicated generally at 20 and including a head 22 and a threaded shank 24. There are formed on the shank 24 a plurality of thread turns of normal cross section comprising ridges 26 and grooves 28. A locking zone comprises two ridges 30 and an intervening groove 32. The ridges 30 and the groove 32 comprise a single locking zone which may cover from a relatively few degrees to as much as a half turn about the axis of the screw. A single screw may contain a single locking zone or alternatively a plurality of locking zones having different relative placements on the screw in order to suit the requirements of the mating part which will normally be called simply a nut. A more complete understanding of the invention will be obtained, however, from an initial consideration of the characteristics of the novel thread form in a single-locking zone to be followed by a description of a preferred method of forming the single-locking zone taken together with the tooling modifications necessary to produce it.

There is shown on a greatly enlarged scale in FIG. 10 the thread profile of a standard screw and in FIG. 11 a self-locking screw including the locking zone consisting of the ridges 30 and the groove 32. The thread form in the locking zone of FIG. 11 may be directly compared not only with adjacent normal threads on the same screw but also with the profile of the thread of the standard screw. In FIG. 10 the standard thread profile is designated generally as that of a screw 34 while the screw profile of FIG. 11 may be considered as an enlargement of a portion of the thread on the screw of FIG. 1. Outside the locking zone, the thread profile of the self-locking screw includes normal ridges 26 generally comparable in shape to ridges 36 of the screw 34 and grooves 28 comparable to standard grooves 38. It will be appreciated that the two threads whose profiles are depicted in FIGS. 10 and 11 were rolled with different dies on different thread rolling machines and are related only in that both are enlargements of ¼–20 threads rolled to a class 2 tolerance.

In FIGS. 10 and 11 the screws 34 and 24 are shown respectively with similar nuts 40 and 42 which have been drawn to the lead and thread angle of the screw 34 thereby assuming zero thread angle and lead difference with a normal screw. Pitch lines 44 and 46 have been supplied to the nuts 40 and 42 respectively and each of the pitch lines represents a mean pitch diameter of 0.2193 for a ¼–20 nut manufactured to class 2 tolerance. The major and minor diameters corresponding respectively to root 48 and crests 50 of the nut 40 are respectively equal to 0.2500 and 0.2009 as are similarly roots 52 and crests 54 of the nut 42. The major diameter has been chosen as the minimum permissible major diameter whereas the minor diameter is a mean figure for a class 2 fit in ¼–20 nuts. In the nut 40 the ridges and grooves are respectively designated by reference characters 56 and 58. In the nut 42 of FIG. 12 the ridges and grooves are respectively designated as 60 and 62. A pitch line 64 is shown on the threads of the screw depicted in FIG. 11. Along pitch line 64 the normal or standard portion of the threads, the ridges 26 and grooves 28 are of equal width. Similarly a pitch line 66 has been supplied on the standard screw thread profile 34 of FIG. 10. Along the pitch line 66 all the ridges 36 and grooves 38 are of equal width.

Turning now to the angular orientation of the flanks of the ridges, it will be realized that, in accordance with standard thread tolerance practice, the thread angle which determines the relative orientations of the flanks on the ridges of the screw 34 and the nuts 40 and 42 is very close to the basic angle. Since these threads are of national form the angle closely approaches 60°, any deviation form 60° together with any lead error in an actual thread being unspecified according to standards but rather absorbed in pitch diameter tolerances and allowances for fits. It is also seen that the thread angle between the ridge flanks defining the normal grooves 28 of the self-locking screw 24 also closely approaches the standard 60° angle. However, the thread flanks defining the locking groove 32 are relatively oriented at an angle somewhat less than 60° and consequently a locking action is obtained between the ridges 30 at points near their crests contacting the flanks of the related nut crest 54 as shown in FIG. 11.

It will be appreciated that the showings of FIGS. 10 and 11 do not represent conditions which are ever encountered during the engagement of standard nuts either with standard screws or with screws having locking zones according to the present invention. Fundamentally these two FIGS. depict differences in clearances between standard mating threaded parts shown in FIG. 10 in contrast to the clearances obtained between a self-locking screw and standard nut as depicted in FIG. 11 when the pitch line of nuts and screws in both FIGS. are separated to the same extent and the nut profiles are substantially identical. In addition it will further be appreciated that the angular orientation of the flanks defining the locking groove 32 is not uniform throughout the locking zone but in fact continuously varies at different angular positions about the axis of the screw. Starting at the entry into the locking zone in one direction the angle of the locking groove 32 varies from a very slight gradually increasing deviation from the standard 60° angle, increasing the deviation to produce a minimum thread angle comparable to that of the groove 32 as shown in FIG. 11 and thereafter decreasing to a lesser degree of deviation from normal but not returning completely to the normal thread angle in a gradual manner before dropping off somewhat abruptly to the normal thread angle. Thus, in a right-hand screw, the leading edge of the thread-locking zone, that which first engages the nut, is somewhat more abrupt than the trailing edge. This difference between leading and trailing ends of the locking zone is a result of the fact that the leading end of the locking zone is in the process of being further deformed when the screw drops out from engagement with the rolling dies at the end of a rolling operation. This aspect of the invention will be more fully appreciated as will the other variations from normal thread profile which produce the locking action, when the flow of screw blank material during the rolling action is explained.

The thread-rolling process and die configuration which will be explained are also responsible for other deviations from standard thread form in the locking zone. These other factors include slightly truncated crests on the locking ridges 30 resulting in a slightly broader and lower crest, a root 68 of the locking groove 32, which is appreciably higher or at a greater radius than the roots of normal threads and a slightly greater thickness of the locking ridges 30 along the pitch line 64.

Figure 4:
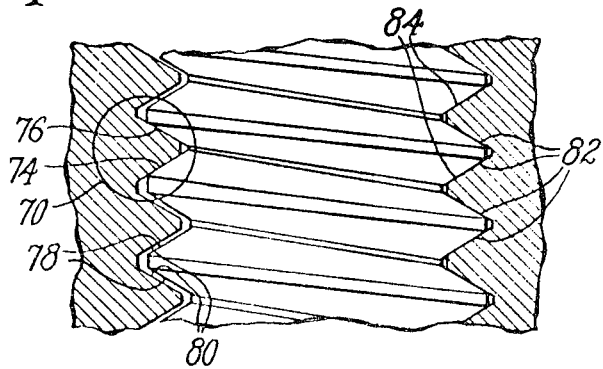
FIG. 4 is a view in cross section and on an enlarged scale of the relationship of a standard nut with a screw having a locking zone according to the invention.

In FIG. 4 a single-locking zone encircled at 70 may be considered as the equivalent of the locking zone comprising the ridges 30 and the groove 32 in FIG. 11 but will now be described in its locking effect in engagement with a nut 72 rather than by considering, as was done in relation to FIGS. 10 and 11, the comparison of normal and locking thread profiles with their pitch lines in spaced relationship d without reference to the elastic deformation which takes place during the engagement of a self-locking screw according to the present invention with a standard mating part.

As depicted in FIG. 4 an upper locking flank 74 and a lower locking flank 76 in the zone 70 have been elastically deformed generally to conform to the mating flanks of the nut 72. Under the condition depicted in FIG. 4 in which the screw including the locking zone 70 is free of tension, normal screw flanks 78 tend to be centralized and in spaced relationship with nut flanks 80 in the axial plane and on the same side as the locking zone 70. At the same time however the screw is shifted somewhat radially in the nut away from the locking zone 70 so that screw flanks 82 diametrically opposite the locking zone 70 are wedged into intimate contact with nut flanks 84. Thus locking action is obtained from the forceful engagement of the flanks 74 and 76 as they are elastically deformed from their original, less than normal angular relationship to conform to normal thread flanks 80 and from the tight engagement of the opposite screw flanks 82 with the nut flanks 84. Under conditions of screw tension, if it is assumed for example that an article of some thickness is tightly gripped between the nut 72 and a head (not shown) on the screw including the locking zone 70, there is a resultant slight axial shifting of the nut on the screw as the locking flank 74 and normal flanks 78 correspondingly oriented on the lower surface of successive screw ridge turns are tightly engaged by corresponding surfaces of the nut 72 while the screw flanks 78 on the upper surface of normal thread turns are spaced away from corresponding flanks of the nut. The flank 76 tends to return toward its unstressed state, the crest terminating the flank 76 maintaining its contact with the related nut flank and thereby contributing substantially to the locking action. In order still further to improve the elastic clamping action of the flanks 74 and 76 on the related flanks of the mating thread in the nut 72 locking screws according to the present invention are, whenever feasible, of a greater hardness than the nut. Thus when the nut is of relatively soft steel the screw may be of a heat treated alloy steel or a case hardened mild steel of considerably greater surface hardness than its mating thread. Similarly, as will readily occur to those skilled in the metallurgical art, nonferrous screws may be made harder than the mating threaded members by selecting different analyses, by heat treatment, or by work hardening, particularly work hardening inherent in the thread rolling operation.

Figure 2:
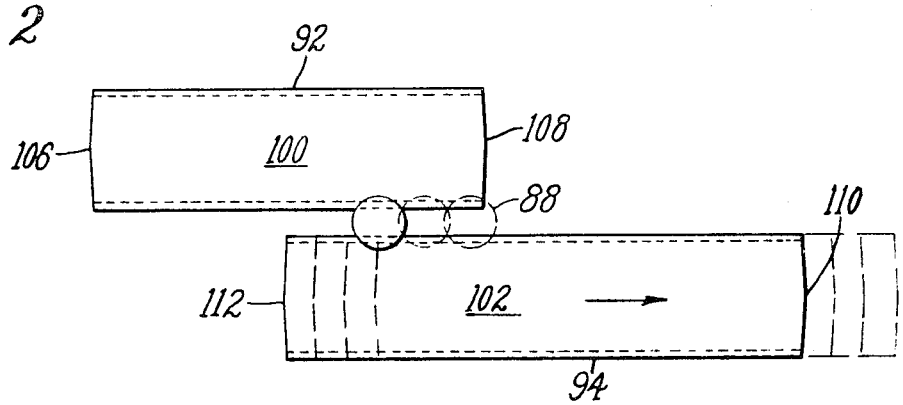
FIG. 2 is a plan view of a pair of rolling dies engaging a screw for forming threads including a locking zone in the shank of the screw.
Figure 3:
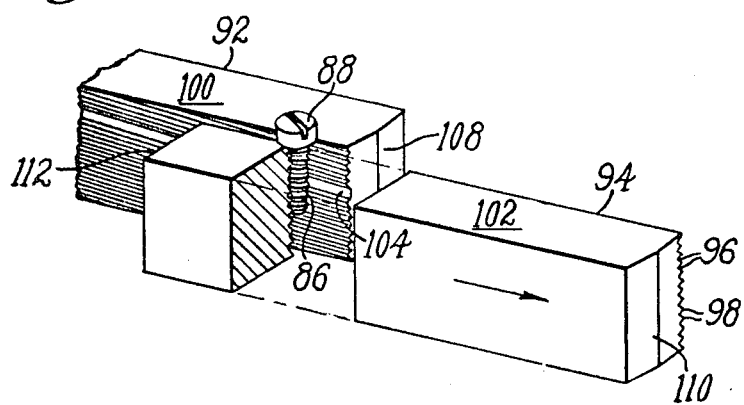
FIG. 3 is a view in perspective of a pair of rolling dies one of which has been modified to produce a locking zone on a screw.

In FIGS. 2 and 3, there is shown a screw comprising a threaded shank 86 and a head 88 in the process of having its threads formed by rolling between a pair of dies comprising a stationary die 92 and a movable die 94. The dies 92 and 94 are, except as will now be pointed out, standard in every respect, manufactured in large quantities and available commercially at low costs. Such commercial dies include work engaging surfaces which are formed throughout their widths with alternating grooves and ridges 96 and 98 respectively spaced at intervals equal to the pitch of the screw to be produced and with the grooves and ridges oriented with respect to top surfaces 100 and 102 of the stationary and movable die at an angle equal to the helix angle of the screw. Starting with a commercially available pair of thread rolling dies, each having a full complement of grooves 96 and ridges 98, a lock forming area 104 is formed in the work engaging surface of one of the dies by removing a full ridge, generally by grinding since the dies are bought commercially in their hardened condition. It is convenient to think of the rolling dies as each having a leading end, that is an end which first engages the screw blank and a trailing end which is the last to engage the completed screw. Thus in FIGS. 2 and 3 the leading and trailing ends of the stationary die 92 are designated respectively by reference numerals 106 and 108 while the leading and trailing end of the movable die 94 are designated by the reference numerals 110 and 112 respectively. The lock forming area 104 in the die 92 is formed at a distance from the top surface 100 along the trailing end of the die equal to the distance desired between the underside of the screw head and the locking zone on the screw.

Figure 7:
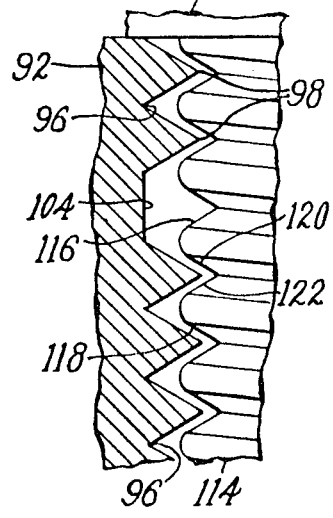
FIGS. 7, 8 and 9 are progressive views partly in cross section and on an enlarged scale of a rolling die and screw showing in separated relationship and exaggerated for clarity the effect on a screw blank during the last half revolution of rolling by a die modified to form a locking zone on the finished screw.
Figure 8:
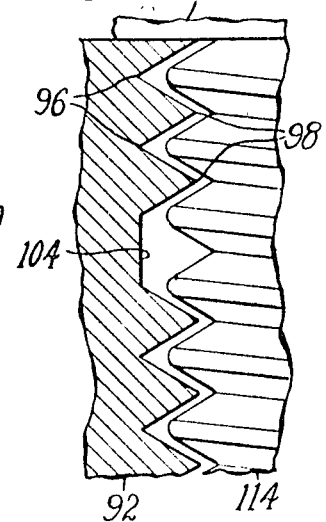
Figure 9:
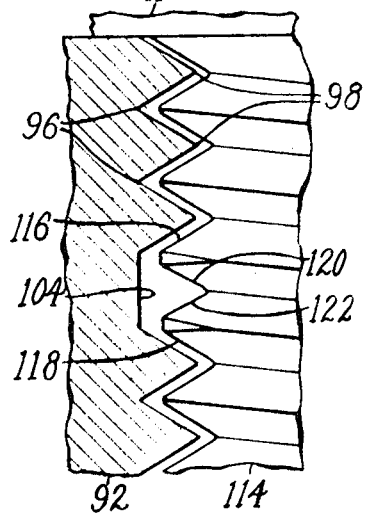

The operation of the lock forming area 104 in producing a locking zone such as that comprising the ridges 30 and the groove 32 shown in FIG. 11, will best be understood by considering the relationship of the lock forming area with the screw threads in the process of formation as depicted in FIGS. 7 through 9 which shows in an exaggerated manner and in separated relationship for clarity successive relative positions of the stationary die 92 and a screw 114 having in an assumed axial plane upper and lower outer flanks 116 and 118 and upper and lower inner flanks 120 and 122. The screw and die conditions depicted in FIG. 9 may be considered as that obtaining at the time when the screw 114 drops out of engagement with the rolling dies. FIG. 8 depicts the relationship existing between the screw 114 and the stationary die 92 one-half turn of the screw before reaching the position of FIG. 9, whereas FIG. 7 illustrates the relative positions of screw and stationary die a full turn before the position of FIG. 9 is reached. Accordingly, the plane of the screw depicted in FIG. 7 is the same as that depicted in FIG. 9 but with the depth of thread shown in FIG. 7 exaggeratedly unformed or of shallower than normal depth, for clarity.

Keeping in mind that the stationary die 92 and the movable die 94 are continuously being pressed into the body of the screws as it rolls from the position of FIG. 7 to that of FIG. 9 and that the threads are accordingly being correspondingly deepened, it will be realized that as shown in FIG. 7 the outer flank 116 is not being worked and the thread root terminating this flank, since it is not in engagement with a die ridge 98 remains shallower than the other root of the screw at the same time and the flank 116 is somewhat thickened by not being worked. In addition since the inner flank 120 is fully engaged by a normal ridge 98 of the die and the flank 116 is unsupported, die pressure is translated into displacement of the flank 116 upwardly.

When the screw 114 is in the position of FIG. 8 the flanks 116, 118, 120 and 122 inclusive are in full engagement with a complete complement of ridges on the movable die 94 and the previous growth of the flank 116 from not having been worked in the position of FIG 7 together with the upward displacement from the pressure on the flank 120 while the flank 116 was unsupported is partially corrected by the movable die. The flanks 118 and 122 however, have maintained a normal or standard relationship with the rolling die in both the positions of FIG. 7 and FIG. 8 and are of normal thickness and position. In rolling from the position of FIG. 8 to that of FIG. 9, both of the outer flanks 116 and 118 arrive in contact with ridges 98 which define the lock forming area 104. However, the flanks 120 and 122 are unsupported so that the pressure on the outer flanks 116 and 118 is translated into a displacement of the inner flanks 120 and 122 toward each other. The flank 116 which was not worked in the position of FIG. 7 and only partially reformed while the screw was in the position of FIG. 8, causes the flank 120 deflected from normal position to a slightly greater extent than the flank 122. Also, because no die ridge is present to operate upon and support the flanks 120 and 122 in the position of FIG. 9, the root between these two flanks is slightly shallower than the normal roots and the partial thread turns defined by the flanks 118 and 122 and 120 and 116 tend to have a somewhat greater thickness than the normal threads along their pitch line. This increased thickness as well as the increased root radius between the flanks 120 and 122 may be controlled accurately by die adjustment in the thread rolling machine. The thread depth as measured radially from the root of the locking groove to the crests of the locking ridges is generally greater than 90 percent of the depth of normal threads in the same screw.

A number of characteristics of locking threads according to the present invention will now be apparent in view of the preferred method by which the locking zone is produced and of the tooling employed in its production. It will first be appreciated that as the screw blank progresses from the leading end 106 to the trailing end 108 of the stationary die, it typically completes 4 to 6 revolutions in a counterclockwise direction as seen in FIG. 2. From the start of the engagement of the screw blank between the dies, as the screw progresses and the thread on its shank is being formed to a greater depth, potential locking zones are continuously being formed and subsequently being reformed into normal threads. As a result, the only locking zone in the finished screw is that at the predetermined level of the lock forming area in the last half revolution before the completed screw passes the trailing end 108. The fact that the screw is rotating in a counterclockwise direction as viewed in FIG. 12 causes a slightly more abrupt return to normal thread sections in the area of a radial plane on the screw which coincides at the time of release with the trailing end 108 of the stationary die 92. This factor is minimized however by the fact that standard commercial rolling dies are normally tapered away from the flat work engaging surface for a distance equal to approximately one-eighth inch at the end.

Another characteristic which has been mentioned is that the root between the flanks 120 and 122 as shown in FIG. 9 generally tends to be slightly higher than normal thread roots. Ample clearance is provided however between the higher than normal root and the minor diameter of nuts which generally provide 75 percent or less of full thread engagement. Finally because the two locking ridges, the first defined by the flanks 116 and 120 and the second by the flanks 122 and 118 are finally formed without confinement by an intervening die ridge 98, the crests of these two ridges tend to be slightly lower and broader than normal. Neither the increased breadth nor the slight truncation appreciably changes the fit of the screw 114 in a standard nut. The locking action is produced largely by the localized pressure applied by the flanks 120 and 122 which are relatively oriented at less than a normal thread angle, being elastically deformed by engagement with normally oriented flanks of the mating thread. The tendency of the normal mating thread to reform the angle between the flanks 120 and 122 is resisted by the elasticity of the material and limited by the fit of the normal screw threads with the mating part. Accordingly, upon disengagement from a mating thread the flanks 120 and 122 resume a position very close to their original as-rolled position and therefore maintain their locking ability under the most severe reusal tests.

It has been found not only that a locking zone may be formed in a screw during the original rolling of the thread according to the present invention but also that screws having normal rolled threads may be processed with dies having a lock forming area such as that already described to produce a screw having a lock forming zone characterized by self-locking characteristics very similar to those obtained in a screw in which the locking zone is formed at the same time that the normal threads are originally rolled. Because a screw during a normal thread rolling operation is in very high compression along a line perpendicular to the work engaging surfaces of the die, the screw, while being rolled, assumes a slightly ovoid cross section which turns circular upon release from the dies. It is for this reason that a normal or standard screw may be rerolled to produce a screw having a locking zone, the difference between the minor axis of the stressed screw and the diameter of the unstressed screw essentially providing the material for the formation of the locking zone.

Figure 5:
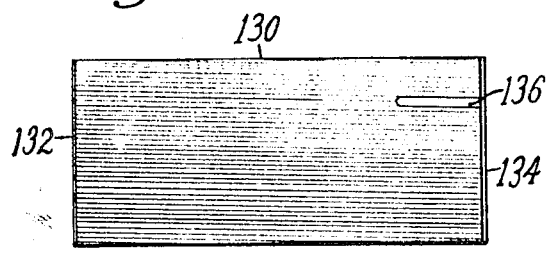
FIG. 5 is a view in perspective of a rolling die having a modified lock forming area.
Figure 6:
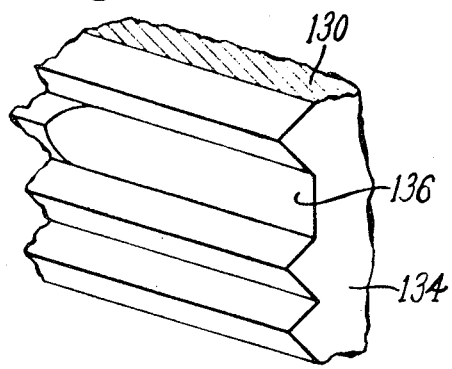
FIG. 6 is a fragmentary view on an enlarged scale showing the lock forming area in the die of FIG. 5.

In the foregoing description of tools and processes for forming locking zones on screws, the removal of a ridge extending the entire length of one of the rolling dies has been suggested. A useful alternative for practicing the invention is depicted in FIGS. 5 and 6 in which a stationary thread rolling die 130 having a leading end 132 and a trailing end 134 respectively comparable to the ends 106 and 108 of the die 92, is modified to provide near the trailing end a lock forming area of limited longitudinal extent. The lock forming area indicated at 136 is formed by grinding away part of a single ridge but only for a length equal to one-half or even less of the pitch circumference of the screw to be operated upon. It will be appreciated from reviewing the description of successive relationships of the screw 114 and the die 92 flow of the material of the screw 114, that a screw produced by the die 130 is characterized in its locking zone by crests more nearly approaching normal height and form, a root of more normal depth and a thickness at the pitch line of the threads more closely approaching standard values. However, the product of the die 130 exhibits a locking thread groove of reduced thread angle at a point corresponding to the lock forming area 136 and such a screw has been found useful for applications not subject to extreme conditions of vibration or forces tending to disengage the screw from its mating part. In addition, by reducing the length of the locking area 136 to a distance equal to something less than half the circumference of the screw, for example one-quarter the circumference of the screw, an additional element is introduced in the control of installation and removal torque. As a result the basic configuration of the locking area 136, varied in its length and coupled with the relative adjustment of the dies in the rolling machine, provides an effective control of installation and withdrawal torque of the product to suit different environments.

In the foregoing descriptions of the locking zones 104 and 126 each has been described as produced by the complete removal of a ridge on one of the rolling dies, in the case of the area 104 by removing the ridge for the entire length of the die 92 and in the case of the area 136 by removal of the entire ridge for a part of the length of the die 130. It will be appreciated however from the description of the lock forming action as depicted in FIGS. 7 to 9 that the displacement of the flanks 120 and 122 from the standard to the locking position is produced by removing from between these two flanks the normal die support provided by a ridge 98 such as that which acts on the other threads of the screw. It is accordingly possible and within the contemplation of the present invention to employ a die having a lock forming area in which the whole ridge cross section has not been removed but rather in which the ridge has been thinned along its flanks. This may readily be accomplished starting with a standard thread rolling die and grinding, for example 0.001, from each of the flanks of the ridge instead of removing the ridge to produce the lock forming area. While this procedure is more time consuming, requires greater accuracy and is accordingly more expensive, it does permit the exercise of an additional area of control over the shape of the locking zone in the screw and of its locking characteristics.

The product, tooling, and method according to the present invention have thus far been illustrated and discussed with specific reference to pairs of rolling dies in which a single die is modified by the provision of a single-lock forming area. From the foregoing description, however, it will become clear to those of ordinary skill in the thread rolling art that a wide variety of self-locking characteristics may be produced by obvious extensions of the present teaching as contained in the illustrative embodiments. For example, by providing lock forming areas in a single die at regular intervals it is possible to produce a self-locking screw having a plurality of spaced-apart locking zones. Self-locking action of such a screw may be obtained in a standard nut placed at any random position along the length of the screw simply by forming the individual locking zones closer together on the screw than the thickness of the nut. Other expedients which will become apparent to those skilled in the art is that combinations of lock forming areas in both dies either positioned so as to coact in the formation of a single locking zone of greater angular extent about the axis of the screw or to form separate locking zones spaced from one another along the length of the screw and staggered from side to side. Yet another expedient which will become obvious is that a lock forming area may be produced by the removal of more than one adjacent ridges on a single rolling die or alternatively by grinding away the flanks of more than one adjacent ridge. It is accordingly not intended that the scope of the invention should be limited to the specific illustrative embodiments herein described but rather that it be interpreted in terms of the appended claims.

Having thus described my invention, what I claim as new and desire to secure by Letters Patents of the United States is

1. In the method of rolling threads on a screw blank wherein the blank is rolled between two relatively movable dies each having thread forming working surfaces, which include as thread forming surfaces a series of substantially parallel thread root forming ridges and thread crest forming grooves joined by flank forming walls disposed and spaced at angles corresponding to the particular thread helix angle to be formed, said thread forming surface including a locking zone forming area having a thread root forming ridge removed to adjacent crest forming grooves, the steps of first rolling said blank in said dies beginning uniform, continuous helical threads on said blank having a root and a crest joined by flank portions, and subsequently rolling said blank in said dies completing said threads therein and forming a locking zone in a portion of said thread by rolling two adjacent threads only on opposite outer flanks and not on adjacent inner flanks, wherein said adjacent inner flanks are unsupported in said subsequent rolling, thereby deforming the thread defined between said supported and unsupported flanks by shallowing the root between said adjacent flanks and steepening the slope of said adjacent flanks.

2. A die for rolling threads on a screw blank wherein the threads formed include a locking zone comprising a base portion and a thread forming surface on said base portion, said thread forming surface having a series of substantially parallel thread root forming ridges and thread crest forming grooves joined by flank forming walls disposed and spaced at angles corresponding to the particular thread helix angle to be formed and a locking zone forming area adjacent the screw exit end of said thread forming surface, said forming area including a pair of parallel thread root forming ridges separated by a region having a thread root forming ridge removed to adjacent thread crest forming grooves whereby two adjacent threads in said lock forming area are rolled only on opposite outer flanks and not on adjacent inner flanks by said flank forming walls, deforming said threads between said parallel root forming ridges toward said adjacent flanks.

3. A die according to claim 2 in which the removed ridge cross section is removed for the entire length of the die.

* * * * *